United States Patent
Lin et al.

(10) Patent No.: US 6,249,894 B1
(45) Date of Patent: Jun. 19, 2001

(54) METHOD FOR DETERMINING A NEED TO RETRANSMIT A MESSAGE IN A COMMUNICATION SYSTEM

(75) Inventors: Harn-Jier Lin, Bartlett; Lee Michael Proctor, Cary; Mark Hetherington, Crystal Lake, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/033,096

(22) Filed: Feb. 27, 1998

(51) Int. Cl.$^7$ ............................... H04I 1/18; G08C 25/02
(52) U.S. Cl. ............................................................ 714/748
(58) Field of Search ................................... 714/748, 749, 714/55, 18; 455/422, 411, 442; 379/57; 370/332, 335, 252, 343; 375/358

(56) References Cited

U.S. PATENT DOCUMENTS

| | | | |
|---|---|---|---|
| 5,570,411 | * 10/1996 | Sicher | 379/57 |
| 5,884,187 | * 3/1999 | Ziv et al. | 455/522 |
| 5,893,035 | * 4/1999 | Chen | 455/522 |
| 5,909,434 | * 6/1999 | Odenwalder et al. | 370/342 |
| 5,987,326 | * 11/1999 | Tiedemann, Jr. | 455/442 |

\* cited by examiner

Primary Examiner—Albert Decady
Assistant Examiner—Shelly A Chase
(74) Attorney, Agent, or Firm—Kenneth A. Haas

(57) ABSTRACT

The present invention provides a method for determining a need to retransmit a message that includes a user frame from a base station (104) in a communication system (100). A signaling message is inserted into the user frame. The user frame is transmitted from the base station (104) and received at a mobile unit (102). The mobile unit (102) transmits an erasure indicator bit to indicate that the user frame was received by the mobile unit (102). The base station (104) receives the erasure indicator bit. It is then determined, based at least in part upon the erasure indicator bit, whether the signaling message was accurately transmitted by the base station (104) and received by the mobile unit (102). If the signaling message was not accurately transmitted and received, the base station (104) will retrieve the stored signaling message and retransmit the signaling message to the mobile unit (102).

3 Claims, 2 Drawing Sheets

METHOD FOR DETERMINING A NEED TO RETRANSMIT A MESSAGE IN A COMMUNICATION SYSTEM

FIELD OF THE INVENTION

The present invention relates generally to communication systems, and more particularly to a method for determining a need to retransmit a message in a communication system.

BACKGROUND OF THE INVENTION

Communication systems, such as Code Division Multiple Access (CDMA) systems, communicate messages between infrastructure equipment and mobile units. As used herein, a forward message refers to a message generated by cellular infrastructure equipment and transmitted for reception by a mobile communication unit, and a reverse message refers to a message generated by a mobile communication unit, such as a mobile cellular phone.

Currently, two methods are used by CDMA systems to ensure accurate delivery of an important forward traffic channel message to a mobile unit. One example of an important forward traffic channel message is an Extended Handoff Direction message, which directs the mobile to hand off to another base station. The first method is an L2 acknowledgment (Ack) mechanism, and the second method is a quick repeat mechanism.

For the L2 Ack method, per the CDMA air interface standards (IS-95 and J-STD-008), the mobile unit is required to send back an L2 Ack indication within 200 milliseconds from the time the forward traffic channel message is successfully received. The L2 Ack indication, if received by the infrastructure, explicitly notifies the infrastructure that the forward traffic channel message has been received by the mobile unit. If the L2 Ack indication is not received by the infrastructure within a predetermined time limit, the infrastructure may resend the message. The L2 Ack indication may not be received by the infrastructure due to the mobile unit never receiving the forward traffic channel message and therefore has not sent back an L2 Ack indication, or the mobile unit receiving the forward traffic channel message and sending back the L2 Ack indication that is never received by the infrastructure.

One advantage of the L2 Ack method is that the infrastructure will know fairly reliably whether the mobile unit has received the forward traffic channel message. One disadvantage, however, is that there can be a long delay before the infrastructure knows whether the forward traffic channel message has been accurately delivered. When the mobile unit has not received the forward traffic channel message or the infrastructure did not receive the L2 Ack indication, the infrastructure will wait until the timer associated with the L2 Ack mechanism expires to realize that the forward traffic channel message needs to be resent.

A second method for delivering a forward traffic channel message is to use quick repeat techniques. The quick repeat technique sends the same forward traffic channel message multiple times within a certain time frame. This repetition leads to an increase in the possibility that the mobile unit will receive the forward traffic channel message. Although the success rate should be very high, one disadvantage is that the infrastructure will not explicitly know if the forward traffic channel message has been successfully delivered to the mobile unit. Further, the infrastructure may send out a message multiple times unnecessarily, if the mobile unit successfully received the message on the first transmission. One advantage, however, is that there is a decrease in reverse messages sent from the mobile unit to the infrastructure.

Consequently, a need exists for a method for determining a need to retransmit a message that does not require the cellular infrastructure equipment to unnecessarily transmit multiple forward messages, while not increasing the number of reverse messages transmitted by mobile units.

DETAILED DESCRIPTION OF A PREFERRED EMBODIMENT

The present invention provides a method for determining a need to retransmit a message that includes a user frame from a base station in a communication system. A signaling message is inserted into the user frame. The user frame is transmitted from the base station and received at a mobile unit. The mobile unit transmits an erasure indicator bit to indicate that the user frame was received by the mobile unit. The base station receives the erasure indicator bit. It is then determined, based at least in part upon the erasure indicator bit, whether the signaling message was accurately received by the mobile unit. If the signaling message was not accurately received by the mobile unit, the base station will retrieve the stored signaling message and retransmit the signaling message to the mobile unit.

Figure 1:
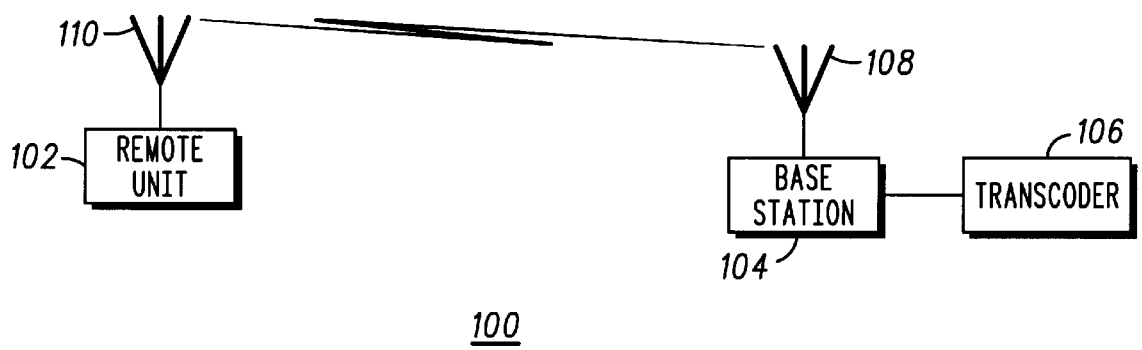
FIG. 1 depicts a communication system in accordance with the preferred embodiment of the present invention.
Figure 2:
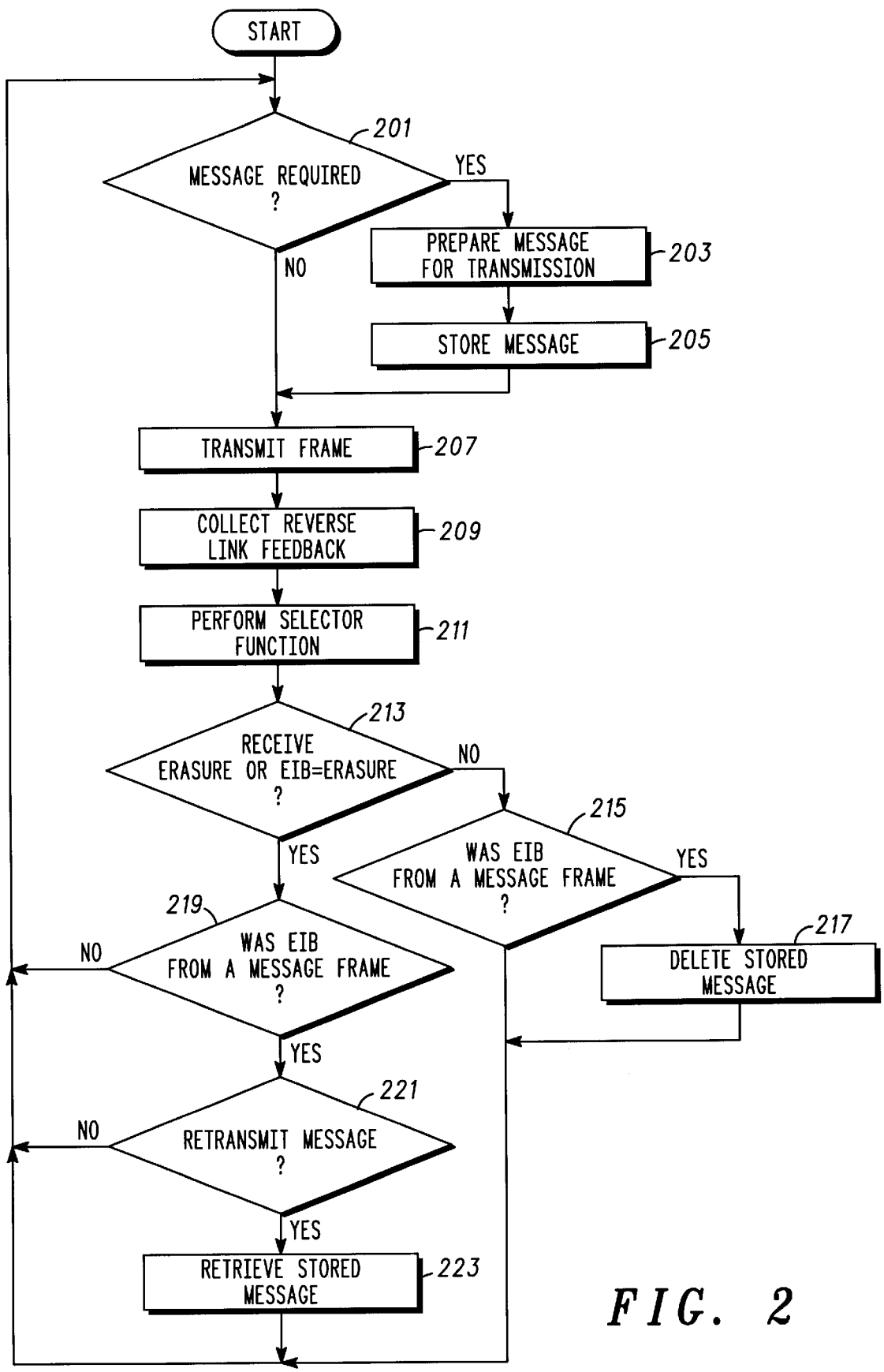
FIG. 2 depicts a flow diagram for determining a need to retransmit a forward message in accordance with the preferred embodiment of the present invention.

The present invention can be better understood with reference to FIGS. 1 and 2. FIG. 1 depicts a communication system 100 in accordance with the preferred embodiment of the present invention. System 100 includes a mobile unit 102, a base station 104, and a transcoder 106. System 100 preferably includes a plurality of mobile units, base stations, and transcoders, but only one of each is depicted in FIG. 1 for clarity. In a preferred embodiment, system 100 is a Code Division Multiple Access (CDMA) system. System 100 may also be any communication system that transmits signaling messages and requires verification of accurate delivery and receipt by mobile units.

Base station 104 is preferably a "MOTOROLA SC9600" base transceiver station. Base station 104 includes a transceiver 108 that includes a transmitter and a receiver. Transceiver 108 transmits, over-the-air, RF signals to be received by mobile unit 102. The transmission is well-known in the art, and will not be described further in this application. Signals transmitted from base station 104 to mobile unit 102 are referred to herein as forward traffic frames, or as forward link messages. Transceiver 108 receives messages from mobile unit 102, as is well known in the art. Such messages are referred to herein as reverse link messages.

Mobile unit 102 is preferably a cellular telephone unit that is capable of communicating with base station 104. In a preferred embodiment, mobile unit 102 is a digital cellular CDMA telephone. Mobile unit 102 includes a transceiver 110 that includes a transmitter and a receiver, as is well-known in the art. Mobile unit 102 communicates with base station 104 by transmitting messages by the transceiver 110 located therein on a reverse link, and by receiving messages generated by base station 104 at transceiver 110 located therein on the forward link.

Transcoder 106 is preferably a "MOTOROLA SUPER-CELL TRANSCODER" system that is commercially available from Motorola, Inc. Transcoder 106 is responsible for managing Layer 2 messaging to and from mobile unit 102 using the L2 Ack method and the quick repeat method of message delivery. Transcoder 106 also acts as a central location for managing power control using the Erasure Indicator Bit (EIB).

Each message transmitted by base station 104 is included within a user frame. The user frame includes a signaling message. The CDMA air interface standards that support Rate Set 2 support the Erasure Indicator Bit (EIB) reported by mobile unit 102 on the reverse link. Currently, the EIB is used for forward channel power control to control the power at which an RF signal is transmitted from a base station. The erasure EIB, if received by cellular infrastructure equipment, indicates that a forward traffic frame has been erased. To overcome this problem on the forward link, base station 104 will increase the forward channel gain to achieve the expected forward link performance. This is preferably accomplished by increasing the power on subsequent transmissions from base station 104.

The present invention utilizes the EIB bit reported by mobile unit 102 to determine if the forward traffic channel message should be resent. The forward traffic channel message should be resent if mobile unit 102 indicates that an erasure has occurred, thereby indicating that the frame was not accurately received. In this manner, the EIB bit transmitted by mobile unit 102 acts like an Ack message for the forward traffic frame transmitted by base station 104.

FIG. 2 depicts a flow diagram for determining a need to retransmit a message. In the preferred embodiment described in FIG. 2, a transcoder approach is utilized wherein the transcoder performs the processing. In an alternate embodiment, a base station approach is utilized wherein the processing is accomplished by the base station. In a further alternate embodiment, a mixed approach is utilized wherein the transcoder performs some of the processing while the base station performs other of the processing steps.

Referring now to the preferred embodiment, the transcoder determines (201) whether an L2 message is required. An L2 message is used to relay call processing information, such as handoff control messaging, between the transcoder and the mobile unit. If an L2 message is required, the transcoder prepares (203) a message for transmission. The message is prepared by inserting a signaling message into a user frame. The transcoder then stores (205) the message, preferably at the base station. The transcoder saves the message so that the message can be retrieved and retransmitted later if the first transmission of the message is not successful. The transcoder also saves a time stamp of the message to allow retrieval of a predetermined message by locating the appropriate time stamp. The base station transmits (207) the frame. The frame is transmitted using well-known techniques of transmitting an RF signal over-the-air. In the preferred embodiment, the user frame is transmitted on a periodic basis, preferably every 20 milliseconds. The mobile unit then transmits an erasure indicator bit to indicate whether the user frame was received. The transcoder then collects (209) reverse link feedback by receiving the erasure indicator bit at the base station. The transcoder then performs (211) a selector function. The selector function selects the highest quality user frame from all available handoff links sent by the mobile unit. The transcoder then determines (213) whether there has been a received frame erasure or an erasure EIB. A received frame erasure indicates that the user frame containing an EIB was not accurately received by the base station. An erasure EIB indicates that the mobile unit did not accurately receive the user frame sent by the base station. If the reverse link feedback was not a received frame erasure or an erasure EIB, the transcoder determines (215) whether the EIB is from a message frame. If the EIB is from a message frame, the transcoder determines that the signaling message was accurately received and deletes (217) the stored message and returns to the beginning of processing.

If the reverse link feedback was a received frame erasure or an erasure EIB, the transcoder determines (219) whether the feedback was associated with the message. If the feedback was not associated with the message, the transcoder begins processing again by determining (201) whether an L2 message is required. If the feedback was associated with the message, the transcoder determines (221) whether to retransmit the message. The transcoder determines whether a message should be resent based on the importance of the message. If the transcoder does not retransmit the message, the transcoder begins processing again by determining (201) whether an L2 message is required. If the transcoder determines to retransmit the message, the transcoder retrieves (223) the stored message. After retrieving the stored message, the transcoder begins processing again by determining (201) whether an L2 message is required. If the stored message is to be retransmitted, the base station will preferably transmit the message at an increased power level. Consequently, if the first transmission occurred at a first power level, the second transmission will occur at a second power level greater than the first power level.

In an alternate embodiment of the present invention, a timer is started to assist in the accurate transmission of a quick repeat message. The transcoder inserts a signaling message into a user frame. Alternately, the base station inserts a signaling message into a user frame. The transcoder embodiment will be used to illustrate this alternate embodiment. The transcoder transmits the user frame, starts a timer, and stores the signaling message. Upon expiration of the timer, the signaling message is retransmitted.

When the mobile unit receives the user frame, the mobile unit transmits an erasure indicator bit to indicate that the user frame was received by the mobile unit. The transcoder receives the erasure indicator bit and determines, based at least in part upon the erasure indicator bit, whether the signaling message was accurately received by the mobile unit. If the message was accurately received by the mobile unit, the base station or transcoder will cancel the timer and delete the stored signaling message.

If the transcoder determines that the user frame is the last user frame, the base station will cancel the timer and delete the stored signaling message.

In addition, the transcoder determines if the message was included within a plurality of frames. If the message was included within a plurality of frames, the transcoder retransmits the entire message. In this manner, if a signaling message was spread across multiple frames, and the entire message is required, the entire message will be resent. This assures accurate receipt of the entire message. However, if only the last frame of a plurality of frames was not accurately received by the mobile unit, the transcoder will retransmit only the last frame, rather than the entire frame.

Although the transcoder approach is preferred, the mixed approach can also be used. In the mixed approach, calls are processed by either the base station or the transcoder, depending on which is currently more suited to perform the processing. For example, a call that is in soft-handoff state is processed by the transcoder. However, when the call is in a one-way call state, the base station performs the processing. Since both the transcoder and the base station know the state of a call, switching between transcoder control and base station control is feasible. The mixed approach provides enhanced response to a forward traffic channel erasure condition when the call is in the one-way call state. However, optimal performance is provided when the forward channel power control mechanism is transferred along with the EIB-based message retransmission mechanism.

Transcoder 106 can correlate the reverse traffic frame transmitted by mobile unit 102 to the forward traffic frame that was not accurately received. If an erasure EIB is received by transcoder 106 after the selection function is performed, and the erasure EIB is intended for a forward traffic frame which contains a forward traffic channel message, transcoder 106 will determine whether to resend the message. In the preferred embodiment, transcoder 106 will determine whether the unreceived forward traffic channel message is important or unimportant. For unimportant forward traffic channel messages, transcoder 106 will preferably not resend the message. For important forward traffic channel messages, transcoder 106 will resend the message.

In the preferred embodiment, when transcoder 106 determines that a forward traffic channel message should be resent, transcoder 106 will immediately blank a frame to deliver the forward traffic channel message. This takes advantage of the forward traffic channel power gain induced by the EIB bit. In this manner, not only does transcoder 106 know that it needs to retransmit a message that has not been received, but transcoder 106 also knows that it should retransmit the message at a higher power level. Consequently, the message has an increased chance of being accurately received by mobile unit 102.

A forward traffic channel message can occupy multiple forward traffic channel frames. In the preferred embodiment, if a forward traffic channel message occupied multiple forward traffic channel frames, any erasure that occurs to one of the multiple frames will result in transcoder 106 retransmitting the entire forward traffic channel message through base station 104. However, if all of the multiple forward traffic channel frames are accurately received by the mobile unit except for the last frame, the transcoder will retransmit only the last frame.

Thus, the present invention provides a method for determining a need to retransmit a message. By utilizing the EIB bit that is currently used to control forward transmission power, the present invention allows updating of current communication systems without upgrading hardware. Explicit acknowledgment of message delivery is provided by utilizing the EIB bit to acknowledge that the message has been delivered properly. Further, because the present invention provides for an acknowledgment of message delivery, transmissions from the base stations are decreased due to the decrease in the need for quick repeats of messages to attempt to increase the chance of accurately delivering a message.

The present invention also provides for quicker detection of lost messages than in current communication systems. In current communication systems, a mobile unit typically sends back an acknowledgment message, such as an L2 Ack indication, within 200 milliseconds from the time the message is successfully received. The present invention provides for quicker detection of a lost message by indicating whether a message has been received in the second outgoing reverse frame. The second outbound reverse frame is typically transmitted within 40 milliseconds from the time the message is received, thereby greatly increasing the time at which the infrastructure learns of whether the message was successfully transmitted.

In addition, since the EIB bit is used for forward power control, messages that are retransmitted are preferably retransmitted at higher power levels. By retransmitting the resent message at a higher power level, the message success rate is improved.

While this invention has been described in terms of certain examples thereof, it is not intended that it be limited to the above description, but rather only to the extent set forth in the claims that follow.

What is claimed is:

1. A method for determining a need to retransmit a message from a base station, the message comprising the steps of:

receiving an erasure-indicator bit (EIB) transmitted from a remote unit;

adjusting, based on the EIB, a forward-channel power at which a signal is transmitted to the remote unit from the base station; and re-transmitting a signaling message to the remote unit based on the EIB transmitted from the remote unit.

2. A method for transmitting a message from a base station, the message including a user frame, the method comprising the steps of:

inserting a signaling message into a user frame;

transmitting the user frame from the base station to a remote unit;

storing the signaling message at the base station;

receiving, from the remote unit, an erasure indicator bit (EIB);

based on the EIB, re-transmitting the user frame to the remote unit; and based on the EIB, controlling a power at which signals are transmitted to the remote unit.

3. A base station comprising a transcoder that adjusts a forward-channel power and re-transmits frames to a remote unit based on an erasure indicator bit being received from the remote unit.

* * * * *